United States Patent
Serafini

(10) Patent No.: US 8,534,126 B2
(45) Date of Patent: Sep. 17, 2013

(54) SENSOR MOUNTING COVER FOR A ROLLING-CONTACT BEARING

(75) Inventor: Andrea Serafini, Turin (IT)

(73) Assignee: Aktiebolaget SKF, Göteborg (SE)

( * ) Notice: Subject to any disclaimer, the term of this patent is extended or adjusted under 35 U.S.C. 154(b) by 314 days.

(21) Appl. No.: 12/908,318

(22) Filed: Oct. 20, 2010

(65) Prior Publication Data

US 2011/0088467 A1    Apr. 21, 2011

(51) Int. Cl.
 *G01D 11/24*   (2006.01)
(52) U.S. Cl.
 USPC .......................................... 73/431; 384/448
(58) Field of Classification Search
 USPC .......................................... 384/448; 73/431
 See application file for complete search history.

(56) References Cited

U.S. PATENT DOCUMENTS

| | | | |
|---|---|---|---|
| 7,249,891 B2* | 7/2007 | Aoki et al. | 384/448 |
| 2004/0150392 A1* | 8/2004 | Nakano et al. | 324/207.2 |
| 2005/0028585 A1* | 2/2005 | Matsumura et al. | 73/118.2 |
| 2006/0002644 A1 | 1/2006 | Mitsue et al. | |
| 2006/0159377 A1 | 7/2006 | Shigeoka et al. | |
| 2009/0219017 A1 | 9/2009 | Mizuta | |

FOREIGN PATENT DOCUMENTS

DE  112006003635 T5  11/2008
JP  10073612 A  *  3/1998

* cited by examiner

*Primary Examiner* — Hezron E Williams
*Assistant Examiner* — Mark A Shabman
(74) *Attorney, Agent, or Firm* — Bryan Peckjian; SKF USA Inc. Patent Department

(57) ABSTRACT

A sensor mounting cover is for a rolling-contact bearing and includes a transverse wall and an axial projection joined to the transverse wall and provided with a through-seat for housing a sensor. The sensor faces the bearing from a window defined by an inner edge of the seat and a closure element is associated with the axial projection and is arranged at least around the inner edge so as to close the window.

8 Claims, 2 Drawing Sheets

SENSOR MOUNTING COVER FOR A ROLLING-CONTACT BEARING

The present invention relates to sensors, and more particularly to a sensor mounting cover for a rolling-contact bearing.

In general, known sensor mounting covers typically include a transverse wall and an axial projection joined to the transverse wall, the projection having a through-seat for housing a sensor.

The adverse environmental conditions in which some rolling-contact bearings operate, for example wheel hub bearings, may result in the infiltration of liquid into the bearing through the hole for the sensor, despite the fact that the latter may be fitted with a sealing ring which is compressed between the sensor and the axial projection against an inlet edge of the through-seat.

SUMMARY OF THE INVENTION

The object of the present invention is to provide a sensor mounting cover for a rolling-contact bearing, which is able to overcome in a simple and low-cost manner the drawbacks described above.

According to the present invention, a sensor mounting cover for a rolling-contact bearing comprises a transverse wall and an axial projection, the axial projection being joined to the transverse wall and provided with a through-seat for housing a sensor. The seat is axially bounded by an outer inlet edge for the sensor and by an inner edge defining a window for allowing the sensor to face the bearing. Further, a closure element is associated with the axial projection and arranged at least around the inner edge so as to close the window.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
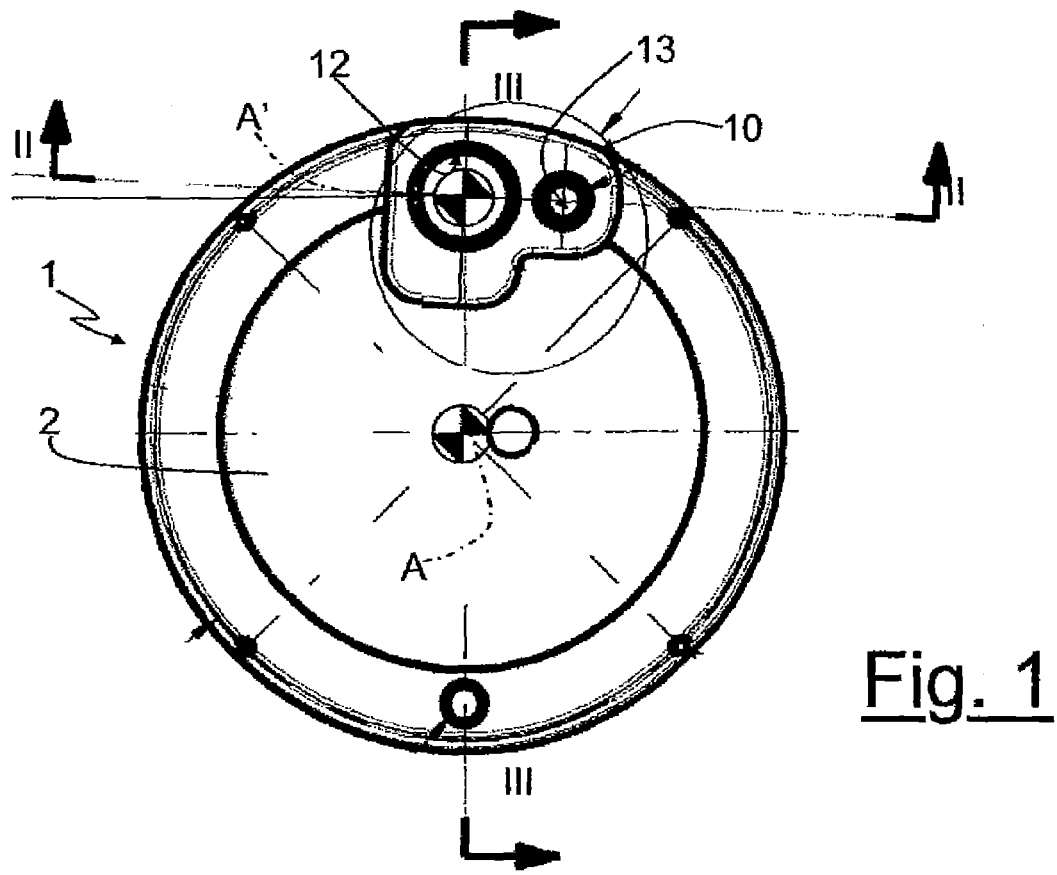
FIG. 1 is a front elevation view, on a smaller scale, of a preferred embodiment of a sensor mounting cover for a rolling-contact bearing according to the present innovation.
Figure 2:
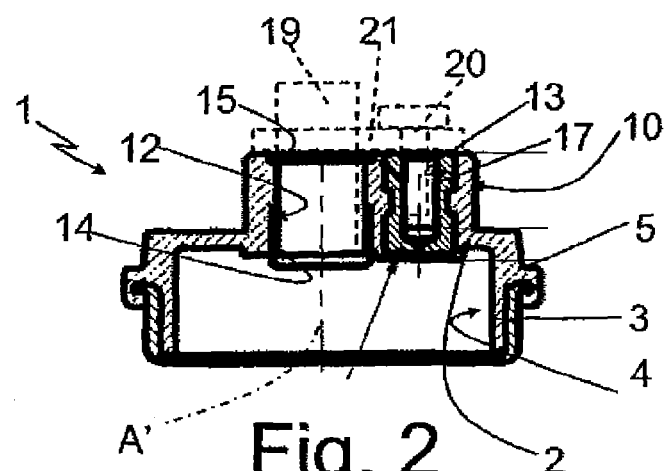
FIGS. 2 and 3 are cross-sections along the lines II-II and III-III, respectively, of FIG. 1.

FIGS. 1 and 2 depict a sensor mounting cover 1 for a conventional rolling-contact bearing (not shown), such as for example, a wheel hub bearing. The cover 1 is configured to be mounted on an outer ring of the bearing and comprises a transverse wall 2, extending transversely with respect to an axis A, and a cylindrical wall 3 joined to the transverse wall 2 and extending around the axis A, the cylindrical wall 3 forming a recess 4 with the transverse wall 2. The cylindrical wall 3 has an annular projection 5 which projects radially outwardly from the wall 3 and defines an axial locating means for the cover 1, which ensures proper assembly of the cover 1 on the bearing.

The cover 1 further includes an axial projection 10 which extends from the wall 2 axially on the opposite side to the recess 4, towards the outside of the bearing, and is arranged along the periphery of the wall 2 in an eccentric position with respect to the axis A.

The projection 10 has two holes 12, 13 which are parallel to each other and to the axis A.

The hole 12 is a through-hole bounded axially towards the inside of the recess 4 by an inner edge 14 and axially on the opposite side by an inlet edge 15 defining a window 16. The hole 13 is configured to house a sleeve or bushing 17, which is internally threaded and is embedded within the projection 10 during manufacture of the cover 1.

The hole 12 defines a seat configured to house a sensor 19 and radially bounded by a cylindrical wall 18, the wall 18 being coaxial with an axis A' that extends parallel to the axis A and forms part of the projection 10. The sensor 19 is disposed within, or inserted inside, the seat via the edge 15 so as to face the bearing (not shown) through the window 16 and is fixed by means of a screw 20 threadedly engaged within the bushing 17 and connected to the sensor 19 by means of a flange or tongue 21.

Preferably, the transverse wall 2 and the projection 10 are formed of a molded plastic material so as to form a single body, which has a sufficient rigidity to ensure positioning of the sensor 19 both within its own seat and with respect to the bearing.

Figure 4:
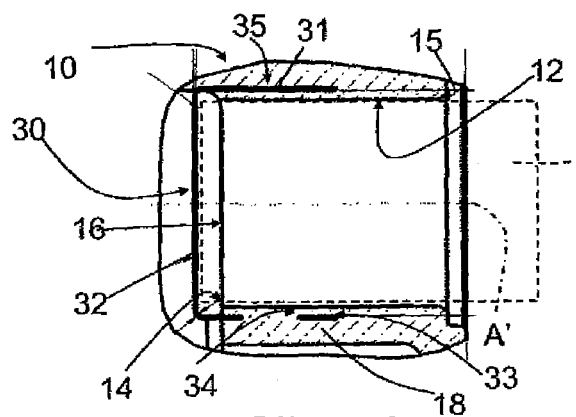
FIG. 4 is a broken-away enlarged view of a portion of FIG. 3.
Figure 5:
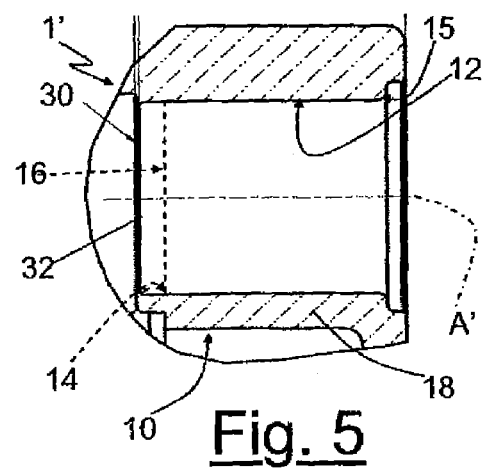
FIG. 5 is a broken-away, enlarged view of a second preferred embodiment of the sensor mounting cover shown in FIG. 1.
Figure 3:
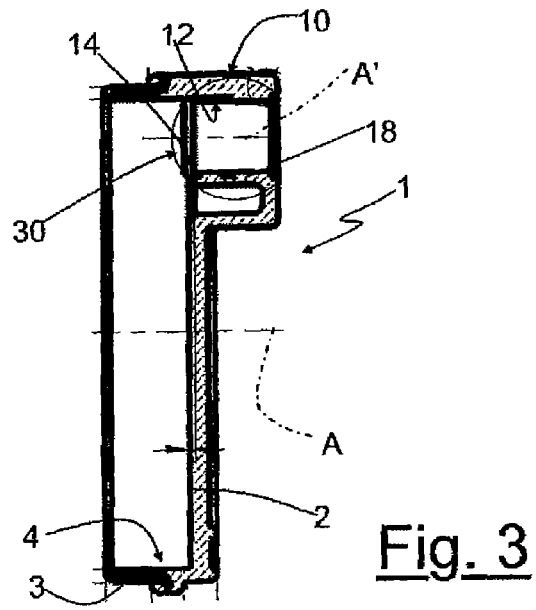

Referring to FIGS. 3 and 4, the cover 1 also comprises a closing lid 30 which is partially disposed within/embedded inside the projection 10 so as to close the hole 12 on the side where the edge 14 is located, i.e., so as to close or obstruct the window 16 to substantially seal the recess 4 from the outside of the cover 1. The lid 30 is preferably includes a cup-shaped body having a cylindrical lateral wall 31 with a thickness, the thickness of the wall 31 having a value less than a value of the thickness of the cylindrical wall 18. The wall 31 is partially embedded inside the cylindrical wall 18 and projects or extends axially from the wall 18 by an amount comparable to the thickness of wall 31.

Preferably, the lid 30 is formed of a non-magnetic material, preferably a metallic material, a plastic or polymer, a textile material, or natural or synthetic rubber. In any case, the lid 30 formed so as to be a liquid-tight material. The particular choice of material for the lid 30 may depend both on the type of application and on the type of sensor to be used, and where applicable, on the particular method or process used to produce the cover 1.

Further, the lid 30 also includes a drum 32 which is joined to the wall 31, has a thickness with a value equal to the value of the thickness of the wall 31, and is arranged facing and parallel to the window 16 so as to separate entirely the seat from the inside of the recess 4, namely from the inside of the bearing (not shown), to substantially prevent the ingress or entry of impurities (e.g., debris, foreign matter, etc.) into the bearing through the hole 12. When disposed within the hole 12, the sensor 19 is positioned in substantial contact with, or at least close proximity to, the drum 32, and the composition of the drum 32, at least in terms of material and thickness, is such as so to not affect readings or measurements taken by the sensor 19.

The partial embedding of the wall 31 inside the projection 10, which is very evident if the cover 1 and lid 30 are made of materials different from each other, imparts a greater rigidity to the projection 10 itself, allowing a further improved positioning of the sensor 19. Further, since this embedding is performed during molding of the cover 1, such structure allows the position of the lid 30 with respect to the hole 12 to be checked, without any risk of incorrect positioning of the drum 32 along the axis A', namely without any risk that the drum 32 may interfere with the sensor 19.

Alternatively, when the lid 30 is formed of a textile material, the drum 32 both ensures a hydrostatic seal and allows to pass inside the bearing, and has a flexibility such as to avoid any damage due to any contact with the sensor 19.

To improve fixing or attachment of the lid 30 inside the projection 10, the lateral wall 31 is preferably provided with one or more through-holes 34 (only one of which is shown in FIG. 4).

During molding of the cover 1, the holes 34 become filled with the same plastic material which forms the cover 1, thereby fixing the lateral wall 31 inside the projection 10 and thus ensuring complete integration of the lid 30 with/inside the cover 1.

Alternatively, the through-holes 34 may be replaced or supplemented with other fixing elements, such as a shaped edge obtained by folding radially outwards an end edge 33 of the wall 31 or/and surface machining, such as knurling of a radially outer surface 35 of the lateral wall 31.

Finally, when the lid 30 is made of a plastic or polymeric material and, when appropriate the same material as the cover 1, a substantial continuity is formed between the material of the lid 30 and the material of the cover 1, such that the two elements blend in entirely with each other, that is, are substantially integral.

Referring particularly to FIG. 4, an alternative embodiment of the cover 1' is similar to the cover 1, but differs mainly in that the lid 30 is both made of the same material as that of the cover 1' and formed so as to be intrinsically connected to the projection 10. The lid 30 is distinguished from the projection 10 by the presence of the drum 32. In other words, in the cover 1', the projection 10 and the lid 30 are molded using the same plastic material and the form of both the cover 1' and the lid 30, or the drum 32, is determined by the form of the mold.

Compared to the cover 1, the cover 1' is even more simple to produce since the lateral wall 31 of the lid 30 and the projection 10 are substantially a single piece made of the same material, and positioning of the drum 32 around the window 14 is obtained directly by means of the form of the mold. The drum 32 forms with the wall 31 a single piece made of the same material and arranged facing the edge 14, or the window 16, so as to isolate entirely the seat 12 from the bearing.

It is understood that the invention is not limited to the embodiments described and illustrated here, which are to be regarded as examples of embodiment of the sensor mounting cover for a rolling-contact bearing, which instead may be subject to further modifications relating to forms and arrangements of parts as well as constructional and assembly details. It is understood, therefore, that this invention is not limited to the particular embodiments disclosed, but it is intended to cover modifications within the spirit and scope of the present invention as generally defined in the appended claims.

I claim:

1. A sensor mounting cover for a rolling-contact bearing comprising:
   a transverse wall arranged transversely with respect to an axis, a cylindrical wall joined to the transverse wall extending around the axis so as to form a recess with the transverse wall;
   an axial projection attached to the transverse wall and being provided with a through seat configured to house a sensor, the seat being bounded axially by an outer inlet edge for the sensor and an inner edge defining a window to allow the sensor to face the bearing; and
   the cover comprising a closure element joined to the axial projection and disposed at least around the inner edge of the seat so as to close the window;
   wherein the closure element defined by a cup-shaped body and comprises a cylindrical lateral wall, the wall being partially recessed into the axial projection and a membrane attached to the cylindrical lateral wall adjacent to the inner edge so as to separate the seat completely from the bearing to prevent ingress of impurities into the bearing, and wherein the axial projection extends from the transverse wall axially on the opposite side to the recess.

2. The cover as recited in claim 1 wherein the closure element is formed of a nonmagnetic material.

3. The cover as recited in claim 1 wherein the closure element is formed of a waterproof material.

4. The cover as recited in claim 1 wherein the closure element is formed of at least one of a textile material and a plastic material.

5. The cover as recited in claim 3 wherein the closure element is molded at least with the axial projection.

6. The cover as recited in claim 3 wherein the closure element includes a fixing means for fixing the lateral wall into the axial projection.

7. The cover as recited in claim 5 wherein the a fixing means include at least one through hole extending through the lateral wall.

8. The cover as recited in claim 5 wherein the cylindrical lateral wall has a thickness, the thickness having a value less than the value of the thickness of the cylindrical wall defining the seat, and is partially recessed into the cylindrical wall.

* * * * *